United States Patent
Largey

(10) Patent No.: US 10,276,156 B2
(45) Date of Patent: Apr. 30, 2019

(54) CONTROL USING TEMPORALLY AND/OR SPECTRALLY COMPACT AUDIO COMMANDS

(75) Inventor: Henry P. Largey, Wylie, TX (US)

(73) Assignee: Nvidia Corporation, Santa Clara, CA (US)

( * ) Notice: Subject to any disclaimer, the term of this patent is extended or adjusted under 35 U.S.C. 154(b) by 734 days.

(21) Appl. No.: 13/408,863

(22) Filed: Feb. 29, 2012

(65) Prior Publication Data

US 2013/0226589 A1    Aug. 29, 2013

(51) Int. Cl.
G10L 15/22    (2006.01)
G10L 25/48    (2013.01)
G10L 25/18    (2013.01)
G01C 21/36    (2006.01)

(52) U.S. Cl.
CPC .............. G10L 15/22 (2013.01); G10L 25/48 (2013.01); G01C 21/3608 (2013.01); G10L 25/18 (2013.01)

(58) Field of Classification Search
CPC ..... G01C 21/3608; G10L 15/22; G10L 25/18; G10L 25/48
See application file for complete search history.

(56) References Cited

U.S. PATENT DOCUMENTS

| | | | |
|---|---|---|---|
| 4,507,653 A | 3/1985 | Bayer | |
| 5,270,480 A * | 12/1993 | Hikawa | 84/645 |
| 5,615,271 A * | 3/1997 | Stevens | G08C 23/02 381/110 |
| 6,760,276 B1 * | 7/2004 | Karr | 367/197 |
| 6,820,056 B1 * | 11/2004 | Harif | 704/275 |
| 7,664,801 B2 * | 2/2010 | Walker | 707/707 |
| 7,957,967 B2 * | 6/2011 | Zakarauskas | G10L 17/26 704/233 |
| 8,130,595 B2 * | 3/2012 | Ohguri et al. | 367/198 |
| 8,560,324 B2 | 10/2013 | Shin et al. | |
| 2008/0083893 A1 * | 4/2008 | Rubenstein | 251/129.04 |
| 2009/0248413 A1 | 10/2009 | Liu et al. | |
| 2011/0140635 A1 * | 6/2011 | Kim | 315/297 |
| 2011/0237220 A1 * | 9/2011 | Matsuoka | 455/411 |

FOREIGN PATENT DOCUMENTS

| | | |
|---|---|---|
| DE | 19517470 A1 | 11/1996 |
| TW | 200941954 A | 10/2009 |

* cited by examiner

*Primary Examiner* — Angela A Armstrong

(57) ABSTRACT

A sound-activated control system includes an audio receiver and a command discriminator. The receiver is configured to receive an audio waveform and to produce a digital audio waveform therefrom. The command discriminator is configured to detect a temporally and/or spectrally compact nonphonetic audio command within the digital audio waveform and to control a voice-activated system an action in response to the nonphonetic command.

20 Claims, 5 Drawing Sheets

CONTROL USING TEMPORALLY AND/OR SPECTRALLY COMPACT AUDIO COMMANDS

TECHNICAL FIELD

This application is directed, in general, to devices, systems and methods for controlling operation of an electronic device.

BACKGROUND

Various electronic devices may be controlled by, e.g. sequences of keystrokes or spoken words. For example, in some cases an electronic device may be controlled directly by voice commands. In other cases a control system, e.g. a voice response system (VRS), may be designed to respond to phonetic commands or key words. However, in some situations it may be difficult to control the device due to ambient noise, such as background conversations.

SUMMARY

One aspect provides a sound-activated control system that includes a receiver and a command discriminator. The receiver is configured to receive an audio waveform and to produce a digital audio waveform from the audio waveform. The command discriminator is configured to detect a temporally and/or spectrally compact nonphonetic audio command within the digital audio waveform and to control a voice-activated system in response to the nonphonetic command.

Another aspect provides an electronic device. The electronic device includes an audio receiver and a command translator. The audio receiver is configured to produce a digital audio waveform from a received audio signal. The command translator is configured to detect a temporally and/or spectrally compact nonphonetic audio command within the digital audio waveform. The command translator synthesizes a phonetic command from the nonphonetic command in response to detecting the nonphonetic command.

Yet another embodiment provides a method of providing voice-activated control. The method includes providing an analog-to-digital converter (ADC) configured to convert a received audio waveform to a digital audio waveform. The ADC is coupled to a command discriminator. The command discriminator in turn is configured to detect a temporally and/or spectrally compact nonphonetic audio command within the digital audio waveform. The command discriminator is further configured to control a voice-activated system in response to the nonphonetic command.

BRIEF DESCRIPTION

Reference is now made to the following descriptions taken in conjunction with the accompanying drawings, in which:

FIGS. 1A and 1B respectively illustrate a time domain and frequency domain representation of a nonphonetic command used in various embodiments to control a voice activated device or system;

FIGS. 2A and 2B respectively illustrate a time domain representation of an audio signal, including a temporally compact burst, and a power peak associated with the temporally compact burst;

DETAILED DESCRIPTION

Figure 1A:
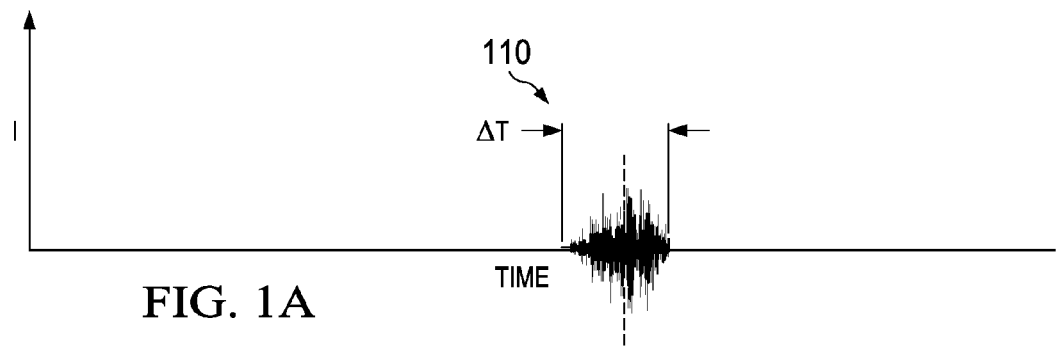

Various embodiments refer to a temporally-compact and/or spectrally compact nonphonetic audio signal. Herein an audio signal may be temporally-compact, spectrally compact, or both. FIG. 1A illustrates without limitation a representative temporally-compact audio signal 110, and FIG. 1B illustrates a spectrum 120 of a representative spectrally-compact audio signal.

First addressing FIG. 1A, temporally compact as used herein in the discussion and in the claims is defined as having a duration on the order of, or shorter than, the duration of a spoken phoneme. For example, a spoken word may be broken up into a number of phonemes having at a normal speaking rate a duration of about 100-500 ms. Some vocalizations, such as consonants, may have a shorter duration, e.g. less than about 100 ms. Thus, the audio signal 110 may have a duration ΔT of about 500 ms or less.

Figure 1B:
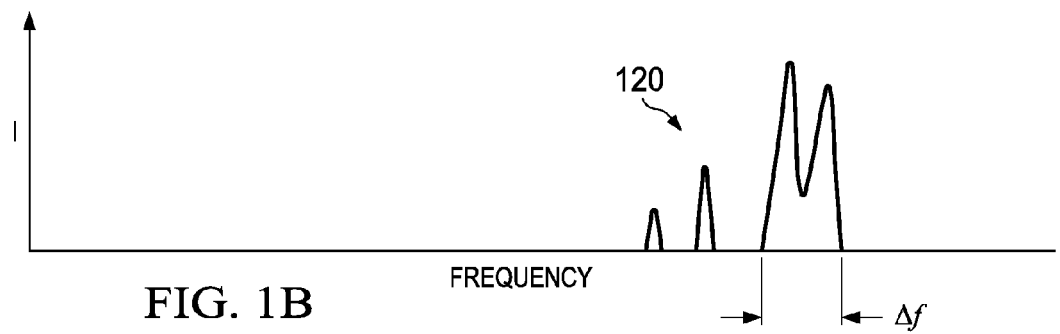

Next addressing FIG. 1B, spectrally compact as used herein in this discussion and in the claims is defined as having at least 50% of the acoustic energy of the nonphonetic audio signal concentrated within a spectral bandwidth substantially less than the spectral bandwidth of typical human vocalization. Substantially less in this context means about 10% or less than the human voice spectral bandwidth. For example, spectral components of human speech typically fall within a range from about 100 Hz to about 5 kHz. The voice band of the electromagnetic spectrum, e.g. from about 300 Hz to about 3 kHz, is often used to convey vocal signals over telephonic equipment. Referring to FIG. 1B, a spectrally compact audio signal may have at least 50% of the acoustic energy concentrated within a bandwidth Δf of about one tenth of the voice band, e.g. about 500 Hz or less.

Various embodiments described herein provide devices, systems and methods for improving communication with voice-activated systems, such as voice-response systems (VRSs) and voice-control electronic devices (herein referred to as VRDs). While such a system or device may work well under conditions of low ambient noise, when the level of background noise becomes too great the device or system performance may degrade due to poor recognition of voice commands. This problem may become especially pronounced in situations in which the background noise includes conversations or other sources of words that may mask or compete with the intended phonetic commands spoken by user of the automated system or device.

The inventor has recognized that the aforementioned difficulties with speech commands may be substantially alleviated by providing a short burst of audio energy that is outside the set of sounds that are typically interpreted as speech. In various embodiments, a non-vocalized sound, or a sound that is rarely or essentially never used in ordinary conversation in the language spoken by the user is employed to communicate with the system or device.

As used herein the term "nonphonetic command" is used to encompass non-linguistic sounds produced by human vocalization. In contrast a "phonetic command" refers to words or portions of words larger than a single consonant that are produced by human vocalization. The nonphonetic command may be used in some embodiments as a cue to the receiving system or device that phonetic commands are imminent, or may augment or replace some or all phonetic commands so that phonetic commands are not necessary to communicate with the system or device. The term "nonphonetic command" explicitly excludes electronically-produced waveforms.

As used herein, "language" explicitly excludes languages that rely on click consonants, such as languages colloquially referred to as "click-tongue", of which Xhosa is one example.

Herein, the term "time domain" may be abbreviated "TD" where such abbreviation does not compromise clarity of the disclosure. Similarly the term "frequency domain" may be abbreviated "FD".

A nonphonetic command represented by one or both of FIGS. 1A and 1B may be superimposed on a background audio signal. The background may be generated by, e.g. several people speaking simultaneously, such as at a party or meeting, machinery, road noise, etc. The background noise may be relatively uniform with respect to time, frequency or both, but need not be. The nonphonetic command is spectrally and/or temporally distinct from other sounds in the background noise. Thus the superposition of a temporally and/or spectrally compact signal on the background is expected to be detectable by a discrimination circuit as described below.

Figure 2A:
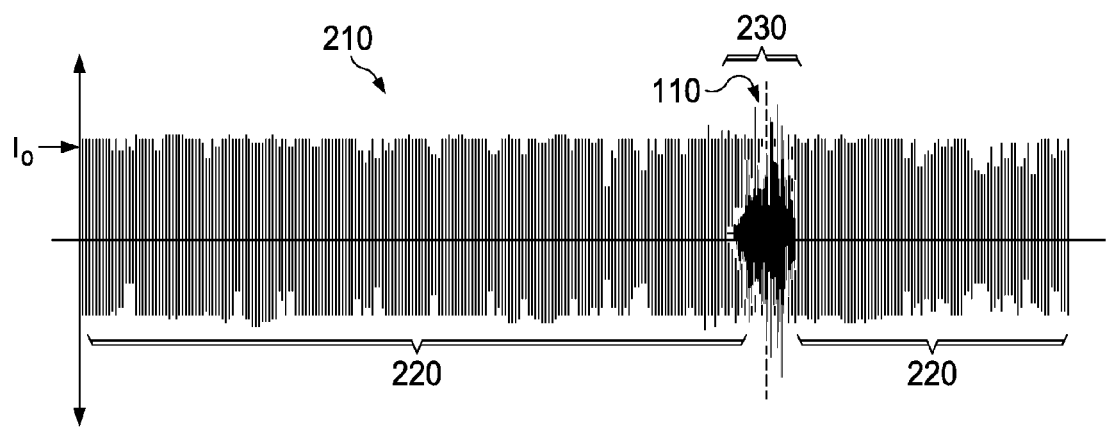

To illustrate this point, FIG. 2A presents a TD waveform 210 of an audio signal, e.g. a mixture of sounds from multiple sources, e.g. several overlapping speakers. The waveform 210 may be an electrical signal obtained from an audio transducer, e.g. a microphone. The waveform 210 has a noise floor with about a constant intensity $I_o$, but embodiments are not so limited. In some cases the intensity of the background noise may be time-variant or even about zero. The waveform 210 includes portions 220 that may represent the ambient sound in a noisy room. A portion 230 includes a nonphonetic command represented without limitation by the temporally-compact audio signal 110.

Figure 2B:
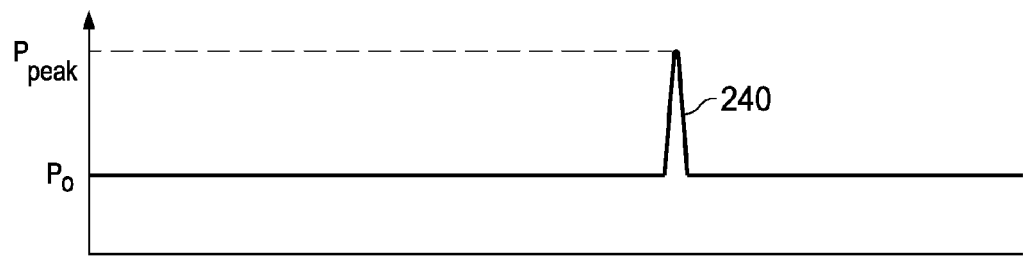

FIG. 2B illustrates a measure of the acoustic power of the waveform 210. A background power $P_o$ is about constant over the portions 220, but embodiments are not so limited. Thus, in some cases the background power may be time variant, or even about zero. A power peak 240 is temporally correlated with the waveform 110. The power peak 240 is analogous to an increase of volume produced by the non-phonetic command. Thus the power peak 240 may be used to detect the occurrence of the temporally-compact audio signal 110 within the waveform 210. The power peak 240 is a measure of the increase of volume detected by the VRS or VRD.

The power peak 240 and the spectrum 120 provide signals that may be detected and exploited to determine the occurrence of a nonphonetic command. In some embodiments a temporally localized increase of power exemplified by the power peak 240 may be used to determine the occurrence of a nonphonetic command without relying on the spectrum 120. In other embodiments the occurrence of a nonphonetic command may be determined using the spectrum 120 without recourse to the power peak 240. In still other embodiments both the spectrum 120 and the power peak 240 may be used to determine the occurrence of a nonphonetic command.

Figure 3A:
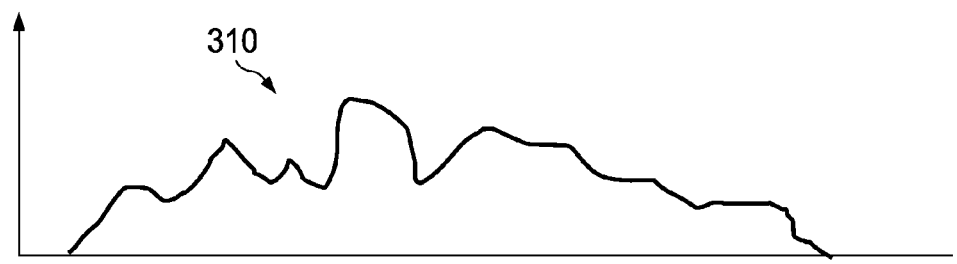
FIG. 3A illustrates a frequency-domain representation of an audio signal, e.g. a composite of sounds in a crowded room.
Figure 3B:
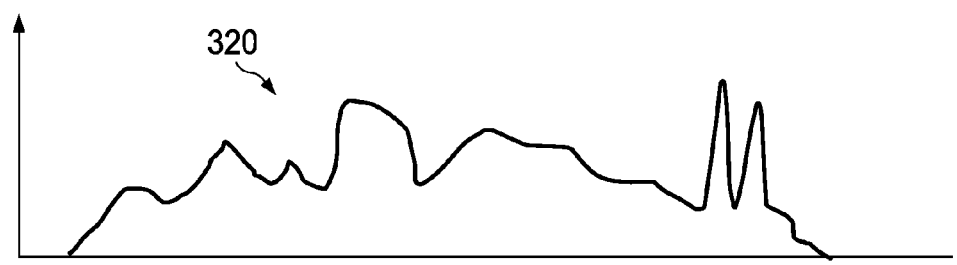
FIG. 3B illustrates a frequency domain representation as in FIG. 3A, additionally including the spectral components illustrated in FIG. 1B.

FIGS. 3A-3B illustrate aspects of a spectrally compact audio command viewed in the frequency domain. FIG. 3A illustrates without limitation a spectrum 310 representing background noise, such as multiple overlapping conversations in a crowded room. While embodiments of the invention may be practiced without such background noise, typically the benefits of such embodiments are more fully realized when background noise is present. FIG. 3B illustrates a composite spectrum 320 that is the combination of the spectrum 310 and the spectrum 120. In various embodiments the frequencies of the spectrum 120 are selected such that the spectral components are easily distinguished from the noise floor of the background noise spectrum 310. In such cases, as illustrated, components of the spectrum 120 are visible in the composite spectrum 320. As described below, detection of these components, with or without detecting the power peak 240, may be used in various embodiments to detect the occurrence of the nonphonetic command.

Various embodiments of the disclosure are now presented in FIGS. 4, 5, 6, 7 and 8. These figures may include various functional modules, and the discussion may include reference to these modules and describe various module functions and relationships between the modules. Those skilled in the art will recognize that the boundaries between such modules are merely illustrative and alternative embodiments may merge modules or impose an alternative decomposition of functionality of modules. For example, the modules discussed herein may be decomposed into sub-modules to be executed as multiple computational processes and, optionally, on multiple electronic devices, e.g. integrated circuits. Moreover, alternative embodiments may combine multiple instances of a particular module or sub-module. Furthermore, those skilled in the art will recognize that the functions described in example embodiment are for illustration only. Operations may be combined or the functionality of the functions may be distributed in additional functions in accordance with the invention.

Figure 4:
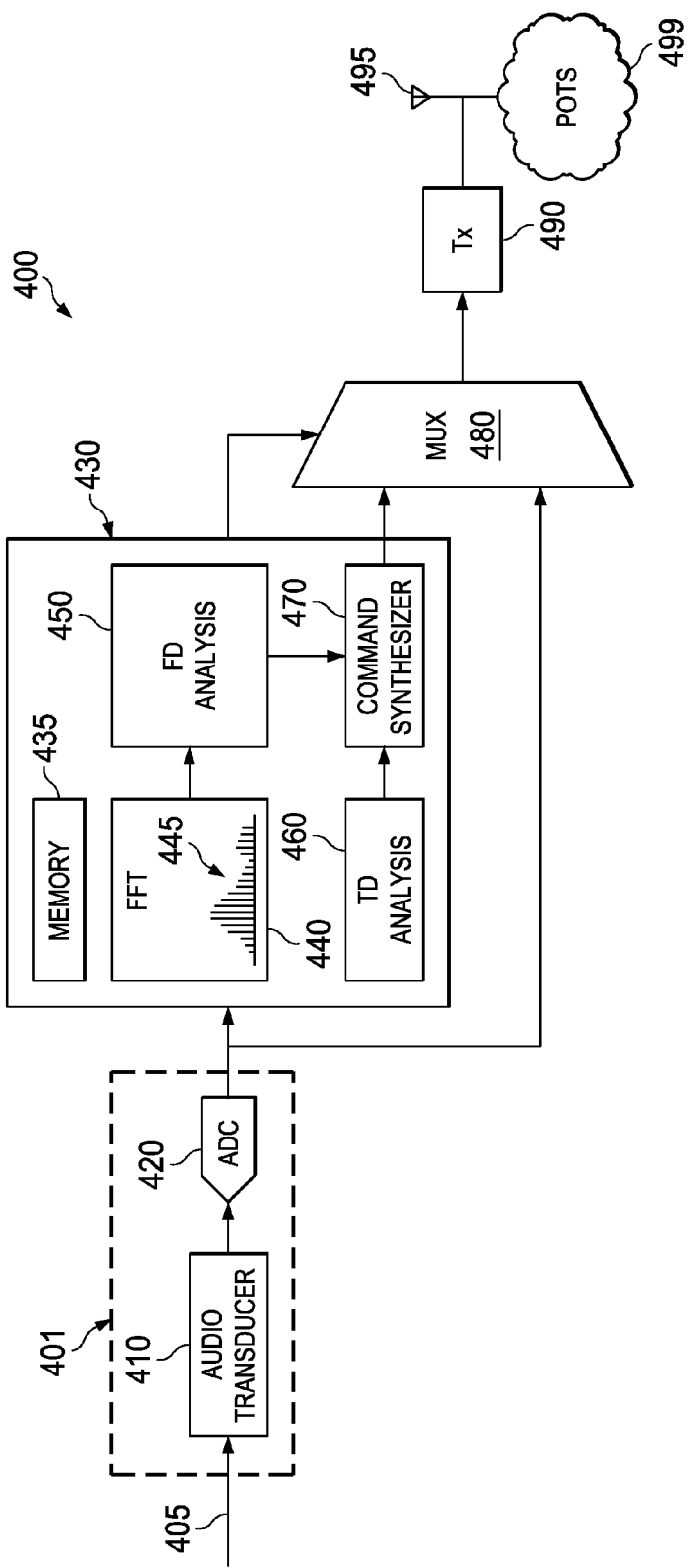
FIG. 4 illustrates an electronic device in one embodiment, including a command discriminator configured to detect a temporally and/or spectrally compact signal within an received audio signal, in which the command discriminator synthesizes a voice command for wired or wireless transmission.

FIG. 4 is a block diagram of a nonlimiting embodiment of an electronic device 400 that may operate in accordance with nonphonetic commands received via an audio waveform 405. In various embodiments the device 400 may be a corded or wireless telephone handset, or a cellular phone. However, description of these specific embodiments is not intended to limit the scope of the disclosure to such devices.

The device 400 includes an audio receiver 401 that includes an audio transducer 410 and an analog to digital converter (ADC) 420. The audio transducer 410 is configured to convert the audio waveform 405 to an analog electrical representation thereof referred to herein as an audio signal. The ADC 420 converts the audio signal to a digitized representation of the audio waveform 405, referred to herein as a digital audio waveform.

A command discriminator 430 receives the digital audio waveform and performs various processing functions thereon as discussed further below. The processing functions may be performed according to instructions stored in a memory 435. The functionality of the command discriminator 430 may be implemented in any conventional or nonconventional manner, including without limitation a commercial or proprietary integrated circuit, state machine, programmable logic, microcontroller or digital signal processor (DSP).

Among the functions provided by the command discriminator 430 are a fast Fourier transform (FFT) 440, a FD analyzer 450 and a TD analyzer 460. As well understood by those skilled in the art, the FFT 440 may determine a spectrum 445 of the received audio waveform 405, or more precisely the digital audio waveform. Components of the spectrum 445 may characterize various types of vocalized and unvocalized sounds, as described above. The FD analyzer 450 may perform spectral pattern recognition to identify within the spectrum 445 sounds that are not associated with normal vocalization.

The TD analyzer 460 also receives the digital audio waveform. The TD analyzer 460 may analyze the digital audio waveform to determine the occurrence of temporally compact power peaks such as the power peak 240. In some cases the command discriminator 430 may use the occurrence of the detected power peak to temporally localize the spectral signature of the nonphonetic command in the digital audio waveform. In other cases the command discriminator 430 may use both characteristics of the power peak and characteristics of the spectrum 445 to determine the occurrence of the nonphonetic command.

The command discriminator 430 may distinguish certain sounds from vocalizations typically produced in speech. The command discriminator 430 may make such a determination using the FD analyzer 450, the TD analyzer 460, or both. The command discriminator 430 may, for example, determine via the TD analyzer 460 the occurrence of a temporally compact sound. The temporally compact sound will typically have a profile that may be characterized by time domain characteristics such as, e.g. intensity, duration, rise time, fall time, and ringing. These characteristics may be sufficient in some cases to determine with a high level of confidence that the temporally compact sound is an audio command.

The command discriminator 430 may also determine the occurrence of an audio command by the spectral characteristics. A sound from a particular source will typically have a distinctive spectral signature. The command discriminator 430 may determine the occurrence of an audio command when a detected spectral signature matches one of several model signatures stored in the memory 435. The audio command may be spectrally compact, providing a high degree of confidence that the audio command is present in the received audio stream.

In some embodiments the command discriminator 430 may determine a confidence level of a command identification from one or the other of the FD analyzer 450 and the TD analyzer 460 and only perform the other analysis if the confidence level is below a predetermined threshold. Such an approach may in some cases reduce overall processing burden on the command discriminator 430.

The nonphonetic commands typically will include temporal and spectral characteristics that allow the command discriminator 430 to distinguish the nonphonetic commands from normal speech. In some cases such sounds may be produced by vocalization of a sound that is not ordinarily associated with spoken words in a particular language. For example, a speaker may produce the spectrum 120 with a click, pop or isolated consonant.

One class of audio commands includes distinct vocalizations. For example, Indo-European languages in general, and the English language in particular, do not include isolated "clicks". A click may be defined as one of several consonants listed in the International Phonetic Alphabet (IPA). In a nonlimiting example the IPA includes four anterior click releases: the laminal alveolar fricated click; the apical alveolar abrupt click; the laminal postalveolar abrupt click; and the lateral alveolar fricated click. Using one or both of TD and FD analysis the command discriminator 430 is in some embodiments configured to discriminate between the occurrence of such clicks in normal conversation, e.g. as a portion of a spoken word, and the occurrence of isolated clicks. Such configuration may include a general discrimination model intended to apply to many or most users, or may include training by a particular user of the device 400.

Training may be accomplished via a training mode. The training mode may, for example, prompt the user with a desired synthesized phonetic command, after which the user may produce one or more nonphonetic commands that the device 400 will henceforth translate to the desired synthesized command. Those skilled in the pertinent art are familiar with various training methods.

The DSP may additionally or alternatively be configured to discriminate between vocalized and non-vocalized sounds. Non-vocalized sounds may include a knock or rap against a solid surface, a whistle or snapped fingers. In other cases, the nonphonetic command may be generated artificially, e.g. by an electronic or mechanical device configured to produce a sound with the desired temporally compact and/or spectrally compact characteristics.

In some embodiments the command discriminator 430 includes a command synthesizer 470. The command synthesizer 470 may determine the command specified by the nonphonetic command and form an audio waveform that conveys an equivalent synthesized phonetic command. The synthesized command may be referred to herein as a phonetic command, even though not produced by a human speaker. In some embodiments the command synthesizer 470 takes input from the FD analyzer 450 and the TD analyzer 460 and determines the intended phonetic command from the TD and FD characteristics of the audio waveform 405. For example, a single vocalized click may be translated to "no", and a double click (e.g. two clicks occurring within a predetermined period) may be translated as "yes". Of course other combinations of clicks, or other nonphonetic commands, may be translated to other synthesized phonetic commands.

When the command discriminator 430 determines a phonetic command that corresponds to one or more nonphonetic commands, the command discriminator 430 may control a multiplexer (MUX) 480 to select the synthesized phonetic command for transmission to the receiving system. A transmitter 490 receives the output of the MUX 480 and in some embodiments transmits the bit stream via an antenna 495. In other embodiments the transmitter 490 conditions the output data for transmission over wires to a wired telephone network 499 (e.g. "plain-old telephone system", or POTS). Thus in such embodiments the nonphonetic command is not actually transmitted by the device 400. Instead the receiving system, e.g. a VRS, receives a waveform consistent with a phonetic command such as "yes" or "no". In the absence of a detected nonphonetic command the command discriminator 430 may control the MUX 480 to transmit the digital audio waveform provided by the ADC 420.

Figure 5:
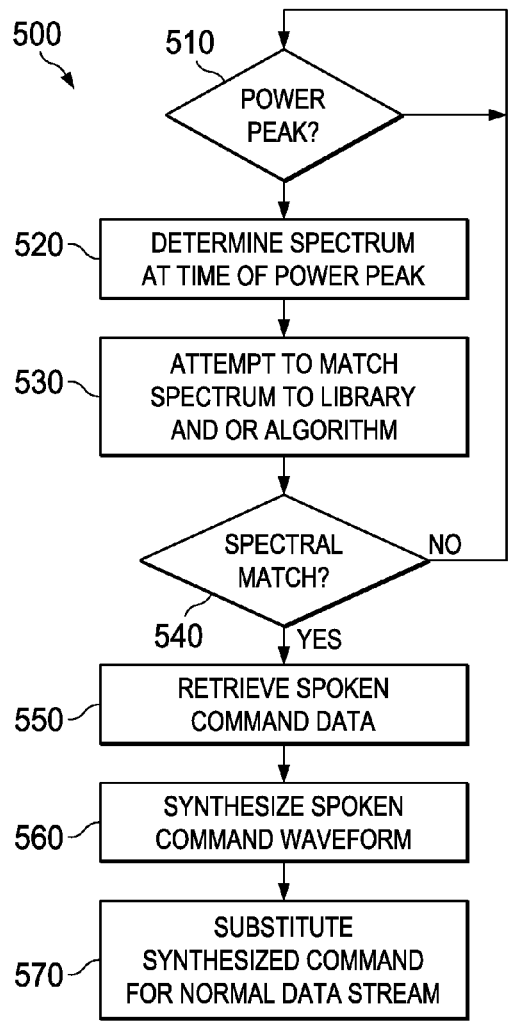
FIG. 5 illustrates a flow diagram of a method of operating an electronic device, such as the device of FIG. 4, to detect the occurrence of a nonphonetic command.

Referring next to FIG. 5, a method 500 is presented to illustrate operation of the device 400 according to one nonlimiting embodiment. In a step 510 the command discriminator 430 monitors the digital audio waveform for the occurrence of a power peak, e.g. the power peak 240. If the command discriminator 430 fails to detected a power peak, the method 500 returns to the step 510. If instead the command discriminator 430 detects the presence of a power peak, the method advances to a step 520.

In the step 520 the command discriminator 430 determines the spectrum of the digital audio waveform, e.g. computes the FFT, at the time of the occurrence of the power peak. Those skilled in the pertinent art will appreciate that such a determination may include buffering digital audio waveform data to allow for spectral analysis to be performed after the power peak is detected in the data. Such buffered data may be stored, e.g. in the memory 435. After the step 520 the method 500 advances to a step 530.

In the step 530, the command discriminator 430 attempts to match the spectrum determined in the step 520 to one of a number of model spectra, or mathematical descriptions of model spectra. The model spectra or their mathematical descriptions may be stored, e.g. in the memory 435. The matching may include, e.g. a determination of various metrics describing quality of fit, and a match probability.

In a step 540 the command discriminator 430 may determine if a match occurred. The command discriminator 430 may require a match probability to exceed a predetermined probability threshold to qualify as a match candidate, and may report the match candidate having the highest probability as the match spectrum. A match indicates the occurrence of a nonphonetic command. If the command discriminator 430 determines the occurrence of a match, the method 500 advances to a step 550. If no match is found the method 500 returns to the step 510.

In the step 550 the command discriminator 430 retrieves from a library of phonetic command waveforms a phonetic command waveform corresponding to the received nonphonetic command. The waveform may, e.g., be an algorithm to produce a synthesized phonetic command corresponding to the nonphonetic command, or may be a sampled waveform.

In a step 560 the command discriminator 430 synthesizes the phonetic command, e.g. by the command synthesizer 470. In a step 570 the command discriminator 430 controls the MUX 480 to substitute the synthesized phonetic command for the digital audio waveform for input to the transmitter 490. The synthesized phonetic command is then transmitted in lieu of the nonphonetic command.

Figure 6:
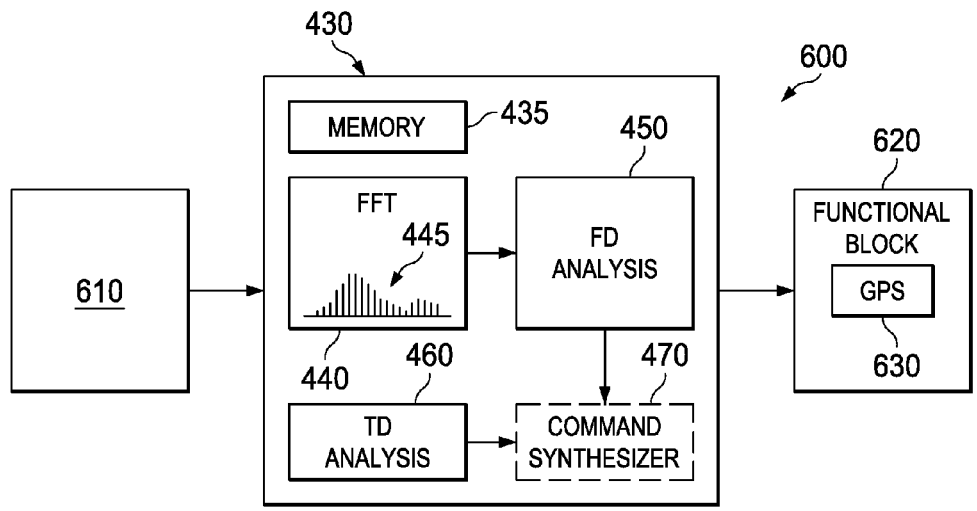
FIG. 6 illustrates aspects of embodiments of an electronic device, in which a command discriminator provides commands to a functional block in response to a detected nonphonetic command.

Turning to FIG. 6, a system 600 is illustrated according to another embodiment of the invention. The system 600 may share several features of the device 400, e.g. the command discriminator 430, memory 435, FFT 440, FD analyzer 450 and TD analyzer 460. Unless described otherwise, these modules operate as described previously. The system 600 also includes an input interface 610 and a functional block 620.

The input interface 610 may take a number of different forms depending on the intended application of the system 600. In some embodiments the system 600 includes a voice-activated electronic device such as a global positioning system (GPS) navigator, smart phone, digital memo recorder or the like. In such embodiments the input interface 610 may be configured as described for the receiver 401 (FIG. 4). Thus, the input interface 610 may include an audio transducer 410 and an ADC 420 to receive an audio waveform and convert the waveform to a digital audio waveform. The command discriminator 430 may operate on the digital audio waveform as previously described to detect the occurrence of a nonphonetic command.

The command discriminator 430 may communicate the occurrence and identity of the nonphonetic command to the functional block 620. The functional block 620 may then operate to perform the core functionality of the device 600 consistent with the nonphonetic command.

For example, the functional block may include a GPS receiver 630 and mapping functions (not shown). The GPS receiver 630 may be configured to respond to phonetic voice commands. Due to road noise or other cabin background noise, as previously described, the GPS receiver 630 may have difficulty discriminating some voice commands from the background noise. Nonphonetic commands may be used instead of or in addition to phonetic commands to control the functionality of the GPS receiver 630. In some embodiments the GPS receiver 630 is configured to interpret electronic signals from the command discriminator 430 as being equivalent to various phonetic commands. In other embodiments the command discriminator 430 includes the command synthesizer 470 and provides a phonetic command to the GPS receiver 630 in response to the nonphonetic command. Similarly, other embodiments of the functional block 620, e.g. recorder or smart phone, may be configured to receive from the command discriminator 430 an electronic signal indicating the occurrence of a nonphonetic command, or may receive a synthesized voice command, and then operate to perform its core functionality, respectively for example recording and calling.

In some embodiments the command discriminator 430 and/or its associated functionality may be tightly integrated with the device that includes the functional block 620. For example, a smart phone or GPS unit may include a processor and memory, and may be configured to implement the FFT 440, FD analyzer 450 and TD analyzer 460. Thus, in such embodiments the smart phone, GPS, or similar device, may not include additional components to implement the command discriminator 430.

Figure 7:
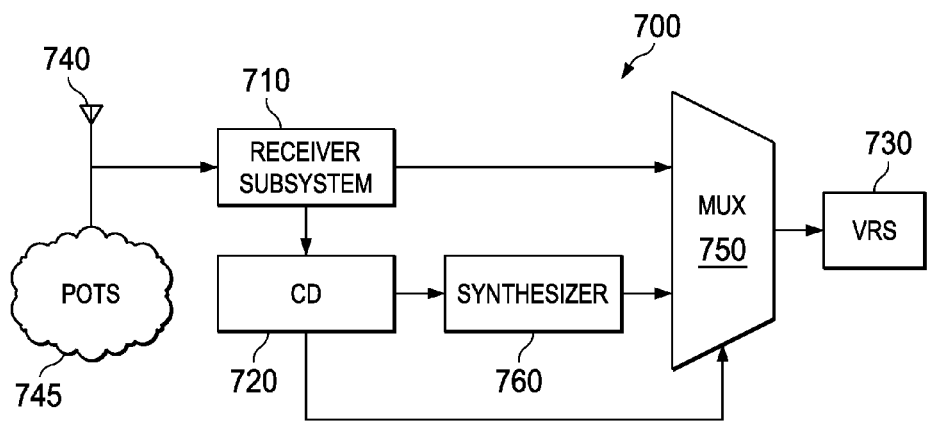
FIG. 7 illustrates a voice response system in one embodiment, in which a command discriminator may translate a received nonphonetic command to a synthesized phonetic command to which the voice response system is configured to respond.

Another embodiment is described by FIG. 7, which illustrates a system 700, for example an embodiment of a VRS as might be used by a bank or other service provider that prompts a caller to provide voice responses to navigate a tree of features available to the caller. The system 700 includes a receiver 710, a command discriminator (CD) 720 and a VRS 730. The receiver 710 and the VRS 730 may be conventional with the exception of necessary modifications to operate with the additional features described below. The receiver 710 may include functionality to receive a wireless signal from an antenna 740 or a wired signal from a POTS 745. The receiver 710 may demodulate the received signal and extract voice commands therefrom. The command discriminator 720 may determine that the received voice commands are phonetic commands and control a MUX 750 to pass the voice commands to the VRS 730.

If the command discriminator 720 instead determines the occurrence of a nonphonetic command as described previously, the command discriminator 720 may control a synthesizer 760 to synthesize the corresponding phonetic command, and control the MUX 750 to pass the synthesized phonetic command to the VRS 730. In this manner, the system 700 may provide the caller the ability to use the nonphonetic commands to communicate with the VRS 730 when the caller is in a noisy environment. In some embodiments the functionality of the command discriminator 720 may be tightly integrated with the VRS 730, such that the command discriminator 720 directly communicates the received nonphonetic command to the VRS 730 without the need for synthesizing the phonetic command. In some embodiments the nonphonetic command may be communicated to the command discriminator 720 using out-of-band signaling, thereby bypassing the voice band.

Persons skilled in the art of digital signal processing possess are familiar with the requisite techniques to needed to configure the device 400 and/or the system 600 and/or the system 700 as described herein. For example, such skilled artisans are familiar with various methods for identifying and removing pops and other similar sounds from digitized recordings. Such methods may be applied or adapted as required without undue experimentation to implement the aforementioned embodiments and other embodiments within the scope of the disclosure.

Figure 8:
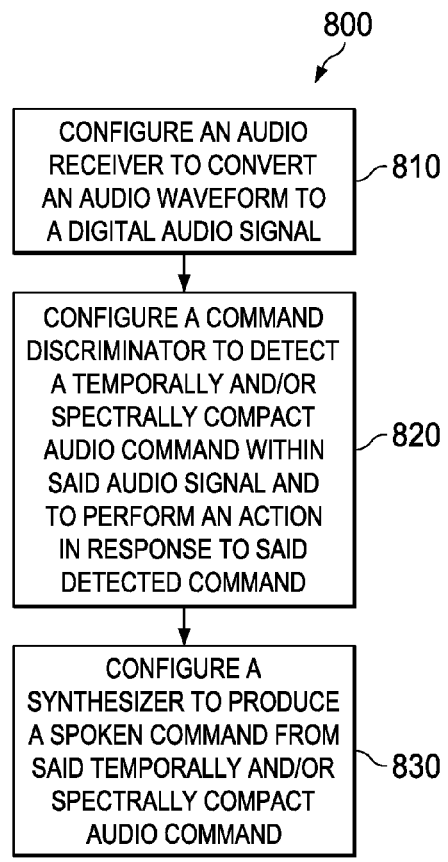
FIG. 8 illustrates a method, e.g. of manufacturing a device or system according to various embodiments of the disclosure.

Turning to FIG. 8, a method 800 of manufacturing is presented, e.g. for forming the aforementioned embodiments such as the device 400, or the systems 600 and 700. The steps of the method 800 are described without limitation by reference to elements previously described herein, e.g. in FIGS. 4-6. The steps of the method 800 may be performed in another order than the illustrated order, and in some embodiments may be omitted altogether.

In a step 810, a receiver, such as the receiver 401, is configured to produce a digital representation of a received audio signal, e.g. a digital audio waveform. In a step 820 a command discriminator, e.g. the command discriminator 430, is configured to detect a temporally and/or spectrally compact audio command within the digital representation and to control a voice-activated system in response to the detected command.

Some of the above-described embodiments of the method 800 may include a step 830, in which a synthesizer, e.g. the command synthesizer 470, is configured to synthesize a phonetic command from the temporally and/or spectrally compact audio command.

In some of the above-described embodiments of the method 800 the compact audio command is a vocalized click. In some embodiments the compact audio command is a snap. In some embodiments the receiver is a component of a telephone switching system. In some of the above-described embodiments the receiver is a component of a voice-activated electronic apparatus.

Those skilled in the art to which this application relates will appreciate that other and further additions, deletions, substitutions and modifications may be made to the described embodiments.

What is claimed is:

1. A sound-activated control system, comprising:
   an audio receiver configured to receive an audio waveform and to produce a digital audio waveform therefrom;
   a command discriminator configured to detect a temporally and spectrally compact nonphonetic audio command within said digital audio waveform and to control a voice-activated system in response to said temporally and spectrally compact nonphonetic audio command.

2. The system of claim 1, wherein said temporally and/or spectrally compact nonphonetic audio command is a vocalized click or a snap.

3. The system of claim 1, wherein detecting said temporally and spectrally compact nonphonetic audio command includes finding an occurrence of a power peak within said digital waveform.

4. The system of claim 3, wherein detecting said temporally and spectrally compact nonphonetic audio command further includes determining a spectrum at a time of said occurrence of said power peak within said digital audio waveform.

5. The system of claim 1, wherein said command discriminator comprises a voice-activated command system configured to distinguish said temporally and spectrally compact nonphonetic audio command from a voice response.

6. The system of claim 1, wherein said receiver is a component of a voice-activated electronic apparatus.

7. The system of claim 6, wherein said voice-activated electronic apparatus comprises a GPS receiver.

8. The system of claim 1, wherein said command discriminator comprises a digital signal processor configured to determine an occurrence of said temporally and spectrally compact nonphonetic audio command in said digital audio waveform.

9. The system of claim 8, wherein determining said occurrence includes performing both a peak power analysis and a spectral analysis of said digital audio waveform.

10. The system of claim 1, wherein said receiver comprises a telephone system interface.

11. An electronic device, comprising:
    an audio receiver configured to receive an audio waveform and to produce a digital audio waveform therefrom; and
    a command translator configured to detect a temporally and spectrally compact nonphonetic audio command within said digital audio waveform and to control a voice-activated system in response to said temporally and spectrally compact nonphonetic audio command.

12. The device of claim 11, wherein said temporally and spectrally compact nonphonetic audio command is a vocalized click.

13. The device of claim 11, wherein said audio receiver is a component of a telephone handset.

14. The device of claim 13, wherein said control includes synthesizing a phonetic command from said temporally and spectrally compact nonphonetic audio command.

15. The device of claim 14, wherein said temporally and spectrally compact nonphonetic audio command has a duration shorter than a spoken phoneme.

16. A method of providing voice-activated control, comprising:
    providing an analog-to-digital converter configured to convert a received audio waveform to a digital audio waveform;
    coupling a command discriminator to said analog-to-digital converter, said command discriminator being configured to:
    detect a temporally and/or spectrally compact nonphonetic audio command within said digital audio waveform, wherein if a confidence level of detecting said temporally and/or spectrally compact nonphonetic audio command using either time domain characteristics or frequency domain characteristics is below a threshold, using both said time domain characteristics and said frequency domain characteristics to detect said temporally and/or spectrally compact nonphonetic audio command; and
    control a voice-activated system in response to said temporally and/or spectrally compact nonphonetic audio command.

17. The method of claim 16, wherein said control includes synthesizing a phonetic command from said temporally and/or spectrally compact nonphonetic audio command.

18. The method of claim 16, wherein said temporally and/or spectrally compact nonphonetic audio command is a vocalized click.

19. The method of claim 16, wherein said converter is a component of a voice response system configured to navigate features available to a caller.

20. The method of claim 16, wherein said converter is a component of a voice-activated electronic apparatus.

* * * * *